United States Patent [19]
Uehara et al.

[11] Patent Number: 4,868,647
[45] Date of Patent: Sep. 19, 1989

[54] ELECTRONIC ENDOSCOPIC APPARATUS ISOLATED BY DIFFERENTIAL TYPE DRIVE MEANS

[75] Inventors: Masao Uehara; Akinobu Uchikubo, both of Hachioji; Jun Hasegawa, Hino; Masahiko Sasaki, Hachioji; Masahide Kanno, Hachioji; Shinji Yamashita, Hachioji; Katsuyoshi Sasagawa, Hachioji, all of Japan

[73] Assignee: Olympus Optical Co., Ltd., Tokyo, Japan

[21] Appl. No.: 234,656

[22] Filed: Aug. 22, 1988

[30] Foreign Application Priority Data

Sep. 14, 1987 [JP] Japan .................................. 52-230664

[51] Int. Cl.$^4$ .......................... H04N 7/18; A61B 17/39
[52] U.S. Cl. ..................................... 358/98; 358/167; 128/4; 128/303.15
[58] Field of Search ...................... 358/98, 213.18, 167; 128/4, 6, 303.13, 303.15

[56] References Cited

U.S. PATENT DOCUMENTS

| | | | |
|---|---|---|---|
| 4,074,306 | 2/1978 | Kakinuma et al. | 128/6 X |
| 4,160,997 | 7/1979 | Schwartz | 128/4 X |
| 4,607,621 | 8/1986 | Wheeler . | |
| 4,618,885 | 10/1986 | Nagasaki et al. | 358/98 |
| 4,706,118 | 11/1987 | Kato et al. | 358/98 |

FOREIGN PATENT DOCUMENTS

61-265987 11/1986 Japan .

Primary Examiner—James J. Groody
Assistant Examiner—Victor R. Kostak
Attorney, Agent, or Firm—Armstrong, Nikaido, Marmelstein, Kubovcik & Murray

[57] ABSTRACT

An endoscope is provided with an isolation circuit which electrically isolates the ground of the input side and of the output side from each other. The isolation circuit is provided in a signal processing circuit which processes the electrical signal obtained by conversion of the optical image obtained by an objective optical system provided at the end of a long thin insertion portion to be inserted into a body cavity in a solid-state image pickup device. A differential drive device drives the isolation circuit by the differential output thereof, whereby any noise is suppressed and isolation is sufficiently performed.

18 Claims, 10 Drawing Sheets

FIG. 7a INPUT SIG. a
(PRIOR ART)

FIG. 7b GND NOISE b
(PRIOR ART)

FIG. 7c OUTPUT c OF ISOL. CC.
(PRIOR ART)

FIG. 9a INPUT SIG. a

FIG. 9b INVERTED SIG. b

FIG. 9c GND NOISE c

FIG. 9d OUTPUT SIG. d

FIG. 11

FIG. 12a  INPUT SIG. a

FIG. 12b  INVERTED SIG. b

FIG. 12c  GND NOISE c

FIG. 12d  OUTPUT d FROM TRANSFORMER

FIG. 12e  OUTPUT e FROM 1 PIXEL CLAMP. CC.

FIG.15a INPUT SIG. a

FIG.15b OUTPUT b FROM DIFFER. DELAY NOISE ELIMIN.

FIG.15c OUTPUT c FROM DIFFER. DELAY NOISE ELIMIN.

FIG.15d OUTPUT d FROM PULSE TRAN.

ELECTRONIC ENDOSCOPIC APPARATUS ISOLATED BY DIFFERENTIAL TYPE DRIVE MEANS

BACKGROUND OF THE INVENTION

1. Field of the Invention

The present invention relates to an electronic endoscopic apparatus provided with an isolation circuit which is driven by a differential type drive means in a signal processing system.

2. Description of Prior Art

Various electronic endoscopic apparatuses provided with an image pickup means such as an electronic endoscope in which a solid-state image pickup device such as a charge coupled device (CCD) serving as an image pickup means is provided at the end of an insertion portion and an endoscope in which a camera is provided on an ocular portion of a fiberscope have been recently proposed.

The image pickup method of the image pickup device used in these electronic endoscopic apparatuses fall roughly into two types depending upon the exposure and read methods of the solid-state image pickup devices. The two types include a type containing a color filter which has a color mosaic filter in front of a solid-state image pickup device so as to simultaneously obtain three color signals R, G, and B and a sequential surface type using a black-and-white solid-state image pickup device in which, for example, sequential surface light R, G and B is projected from an illuminating light source and applied to a target so that the three color signals R, G and B are obtained.

The outline of the sequential surface type of the electronic endoscopic apparatus of the prior art is described below with reference to FIGS. 1 and 2.

Figure 1:
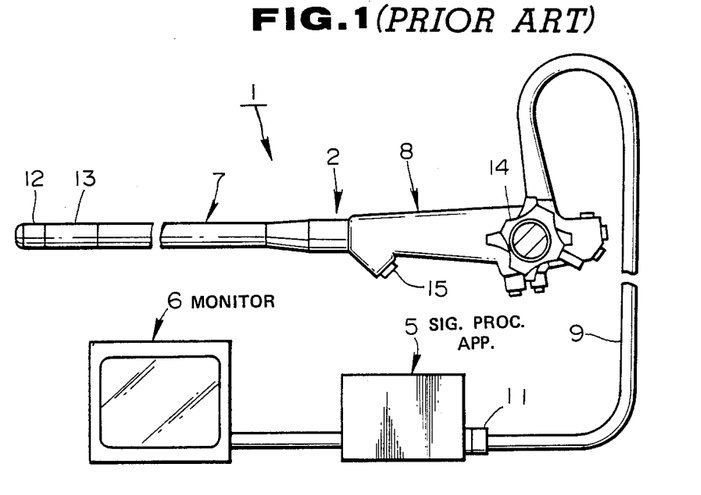
FIG. 1 is a drawing of the appearance of a general electronic endoscopic apparatus.

As shown in FIG. 1, an electronic endoscopic apparatus 1 comprises an electronic endoscope 2, a signal processing apparatus 5 which contains a light source unit 3 for supplying illuminating light to the electronic endoscope 2 and a signal processing circuit unit 4 for processing the image signals obtained by the electronic endoscope 2, and a monitor 6 which is connected to the signal processing apparatus 5.

The electronic endoscope 2 is provided with a long thin, flexible, insertion portion 7 to whose rear end an operational portion 8 with a large diameter is connected. A flexible universal cord 9 is extended sideward from the operational portion 8, and a connector 11 which can be connected to the signal processing apparatus 5 is provided at the end of the universal cord 9.

A hard end portion 12 and a flexible portion 13, which can be curved and which is placed adjacent to the end portion 12 on the rear side thereof, are provided on the end side of the insertion portion 7. A flex control knob 14 is provided on the operational portion 8 so that the flexible portion 13 can be curved in the longitudinal and horizontal directions by rotating the flex control knob 14. An insertion hole 15 communicating with the treatment tool channel provided in the insertion portion 7 is also provided in the operational portion 8.

Figure 2:
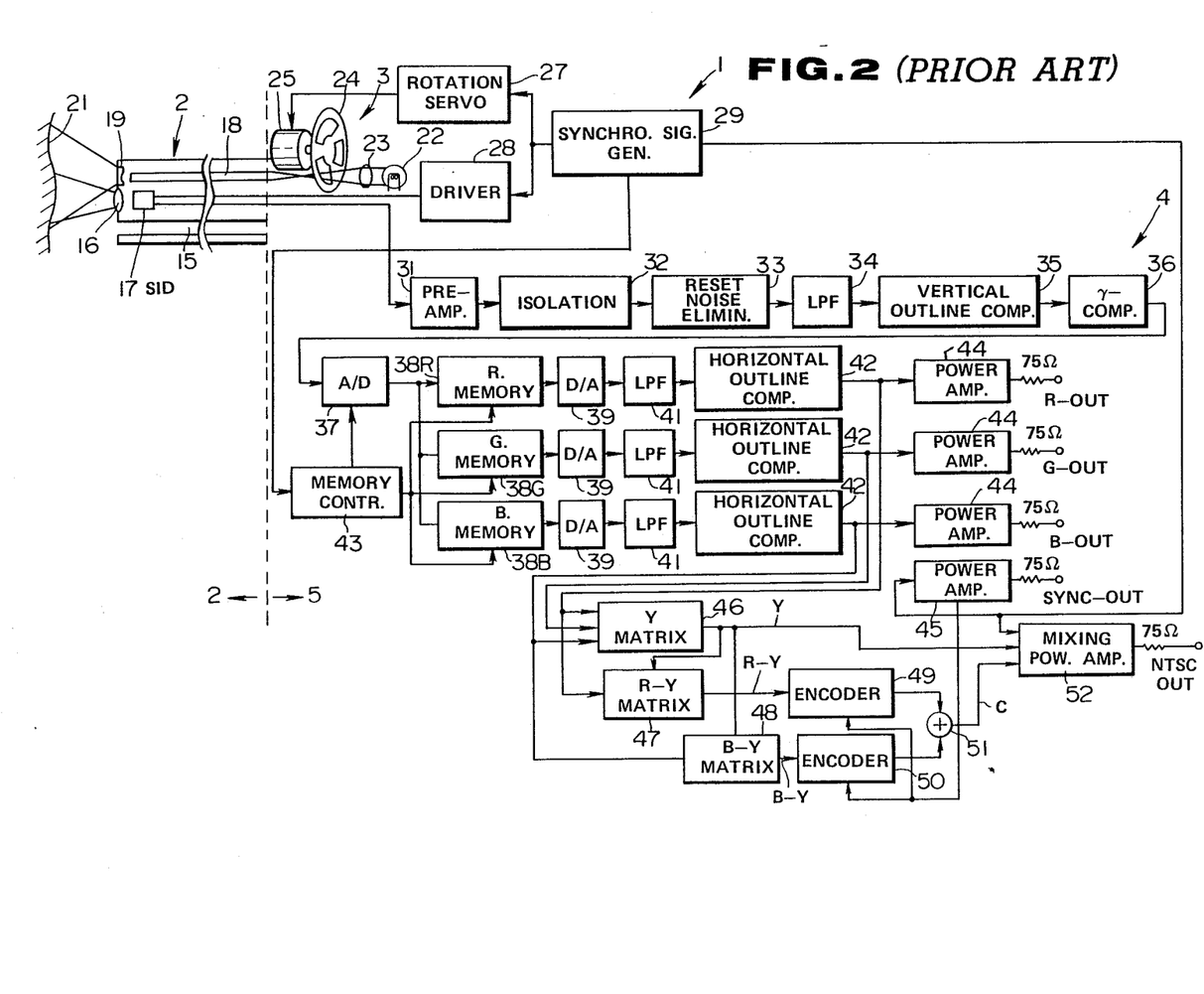
FIG. 2 is a block diagram of the configuration of the signal processing apparatus shown in FIG. 1.

An objective lens 16 and a solid-state image pickup device 17 are disposed in the end portion of the insertion portion 7, as shown in FIG. 2. A light guide 18 for transmitting illuminating light is also passed through the insertion portion 7.

The light source unit 3 is provided with a white light source 22 such as a xenon lamp. The white light projected from the white light source 22 is condensed by a lens 23, changed into sequential rays of light of R, G and B type by a rotating filter 24 which rotates in synchrony with the frame frequency of a video signal (29.97 Hz in the NTSC mode), and applied to a subject such as an organ to be observed in a human body through the light guide 18 and a distribution lens 19. The rotation of a motor 25 for rotating the rotating filter 24 is controlled by a rotation servo circuit 27 so as to synchronize with the frame frequency of a video signal.

The light reflected from the subject 21 is caused to form an image on the image pickup surface of the solid-state image pickup device 17 through the objective lens 17. The formed image is subjected to photoelectric conversion using a read clock signal from a driver 28 to output sequential signals R, G and B. The above-mentioned clock signal and the reference signal of the rotation servo circuit 27 are supplied from a synchronous signal generator 29 which is a single reference signal source. Therefore, all signals (actions) are phase-synchronized.

The sequential signals R, G and B output from the solid-state image pickup device 17 are amplified by a preamplifier 31 of the signal processing unit 4, passed though an isolation amplifier 32 for protecting a patient from any electric shock, and sent to a reset noise eliminating circuit 33 in which any reset noise is removed.

After unnecessary components have been eliminated by a low-pass filter 34, the sequential signals are subjected to vertical outline compensation by a vertical outline compensating circuit 35 and then to γ-compensation by a γ-compensating circuit 36. The output signals from the γ-compensating circuit 36 are converted into digital signals by an A/D converter 37, and the signals read by the illuminating rays of light types R, G, B are respectively stored in one frame memory of frame memories 38R, 38G and 38B which correspond to the sequential surface illumination. The aforementioned frame memories 38R, 38G and 38B are simultaneously read and changed to simultaneous signals which are then converted into analogue signals by D/A converters 39. The conversion rate of the aforementioned A/D converter 37 and the writing of data in and the reading of data out of each of the frame memories 38R, 38G, 38B are controlled by the output signals from a memory control circuit 43.

After the unnecessary components of each of these simultaneous analogue signals R, G and B have been eliminated by low-pass filters 41, the signals are respectively subjected to horizontal outline compensation by horizontal outline compensating circuits 42, then amplified by power amplifiers 44, and output, for example, as primary color signals of types R, G and B with an output impedance of 75 Ω, from output terminals to the monitor 6.

On the other hand, a luminance signal is formed in an R−Y matrix circuit 46 from each of the R, G, B signals which are made simultaneous and subjected to horizontal outline compensation. A color difference signal R−Y is formed from the luminance signal Y and the color signal R in a R−Y matrix circuit 47 and a color difference signal B−Y is formed from the luminance signal Y and the color signal B in a B−Y matrix circuit 48.

These color difference signals R−Y and B−Y are subjected to equilibrium modulation by sub carriers (signals of 3.5779545 Hz with a phase difference of 90 degrees therebetween) in encoders 49 and 50 respectively and subjected to vector composition in an adder 51 to form a chrominance signal C. This chrominance signal C is multiplexed with the luminance signal Y by a mixing power amplifier 52. A composite synchronous signal and a color burst are added to the multiplexed signal to form a composite image signal of the NTSC mode which is then output from an NTSC output terminal.

Figure 3:
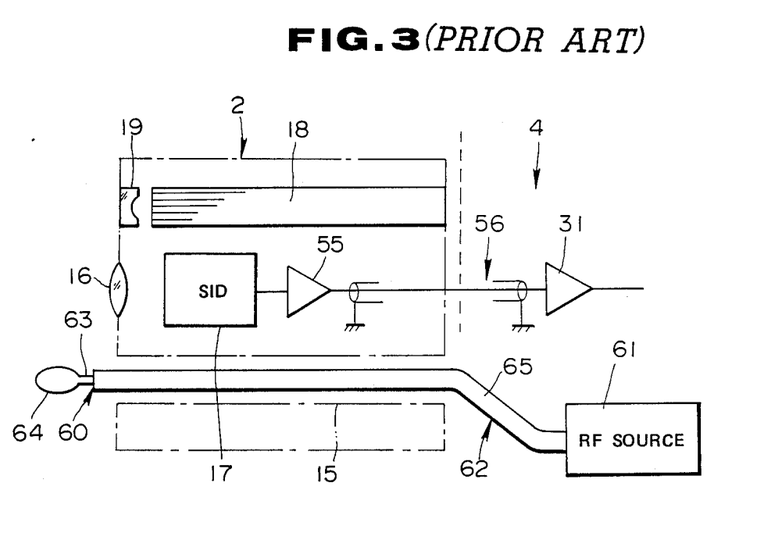
FIGS. 3 and 4 are explanatory views of means for transmitting output signals in prior art.

The transmission of the output signal from the above-described solid-state image pickup device 17 to the signal processing unit 4 has been performed by the method shown in FIG. 3, which is the simplest transmission method.

The output signal from the solid-state image pickup device 17 is passed through a buffer amplifier 55 (in some cases, having an amplification degree) which is disposed near the solid-state image pickup device 17 and is then transmitted to the signal processing unit 4 from the electronic endoscope 2 through a signal transmission cable 56 which is composed of a shielding wire or a coaxial cable. In the signal processing unit 4, the signal is similarily received by a buffer amplifier or a preamplifier 31 and then transmitted to a processing circuit in the next stage.

The endoscopic apparatus has a function as a surgical instrument, for example, a high-frequency electric knife 60 passed through the treatment tool channel 15 is used for ablation or hemostasis of a diseased part. The electric knife 60 comprises a high-frequency power source 61 and a long thin probe 62 which is passed through the treatment tool channel 15, as shown in FIG. 3. The above-described probe 62 comprises a cable portion 63 which is connected to the high-frequency power source 61 and, for example, a loop-shaped electrode 64 for ablation or hemostasis which is connected to the end of the cable 63. The cable portion 63 is covered with a flexible sheath 65.

When ablation or hemostasis is performed using the electric knife 60, the sheath 65 is passed through the treatment tool channel 15 of the electronic endoscope 2. A high-frequency current (generally about 500 KHz) is caused to flow through a human body from a diseased part thereof by the electrode 64 at the end of the cable portion 63.

The electric knife 60 basically effects ablation and hemostasis of a diseased part by using discharge breakdown and Joule heat caused by the high-frequency current. Therefore, in the conventional example shown in FIG. 3, when the electric knife is used, the high-frequency current flowing through the cable portion 63 is induced as noise in the solid-state image pickup device 17, the buffer amplifier 55 and the signal transmission cable 56 of the electronic endoscope 2. The noise affects the image signal processed in the signal processing unit 4, resulting in the display of an image having much noise and significantly impaired qualities.

An example of a measure to deal with this problem is the noise prevention apparatus disclosed in Japanese Patent Laid-Open No. 55923/1985. In this apparatus, as shown in FIG. 4, one ends of signal transmission cables 67, 68 are respectively connected to the differential output terminals of a buffer amplifier 66 in which the output signal from the solid-state image pickup device 17 is input, add the other ends of the two signal transmission cables 67, 68 are connected to an inversion input terminal and a non-inversion input terminal respectively of a differential amplifier 69 in the signal processing unit 4 signal output from the differential amplifier 69 sent to the processing circuit in the next stag.

It is thought that the noise induced in the buffer amplifier 66 is equally superposed on the positive (+) and negative (−) outputs thereof, and that the noise induced in the signal transmission cables 67, 68 is also equivalent. Therefore, the equivalent noise is induced in the two signal transmission paths and these noise components are offset by the differential amplifier 69.

Figure 4:
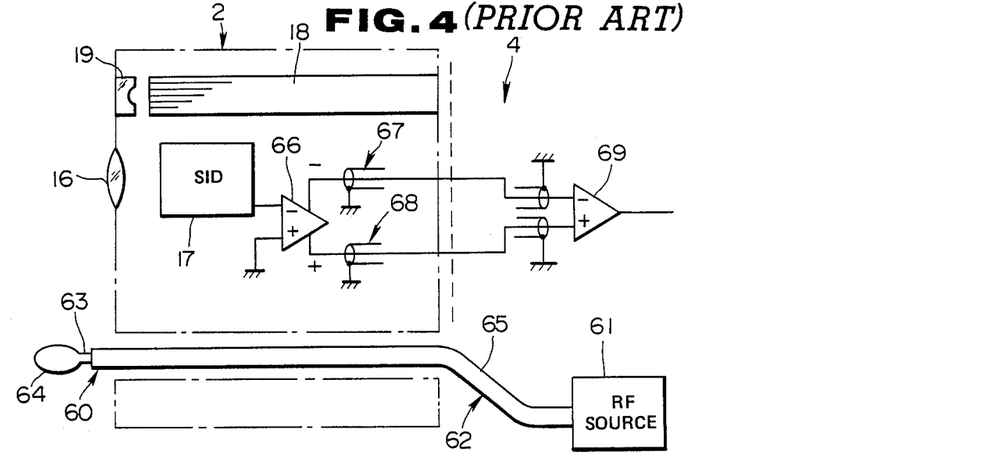

However, in the prior art shown in FIG. 4, since the noise superposed on GND cannot be sufficiently suppressed when the signal is transmitted to a secondary circuit side by an isolation circuit, the noise is also transmitted to the secondary circuit side. In particular, as the ability to eliminate noise is insufficient to the noise caused by the electric knife 60, an image with impaired qualities is still displayed.

Figure 5:
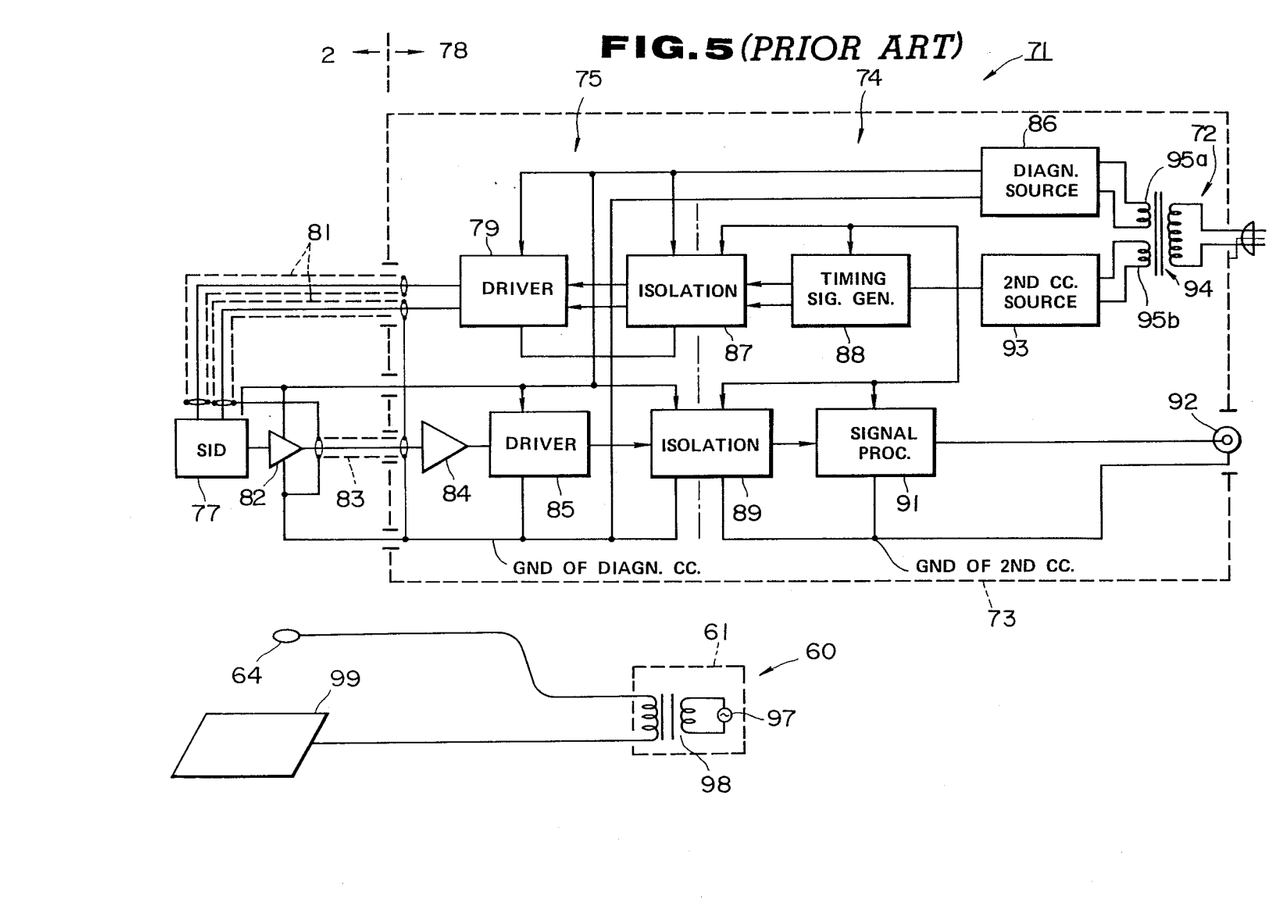
FIG. 5 is an explanatory view of the configuration of an electric system of an electronic endoscopic apparatus which satisfies the safety standards required of a medical instrument.

FIG. 5 shows the entire configuration which satisfies the safety standards required for medical instruments and defined by IEC (International Electrotechnical Commission).

In other words, an electronic endoscopic apparatus 71 which is inserted into the body of a patient and used for a diagnosis or as a surgical instrument and which satisfies the aforementioned safety standards requires a means for strictly protecting the patient from any electric shock.

This apparatus is fundamentally divided into a primary circuit in which a commercial power source is input, a secondary circuit 74 in which a sheath 73 is grounded, and a diagnostic circuit 75 (an electrical circuit in which a patient serves as part of the circuit) which is isolated from the ground of the secondary circuit 74. The isolation resisting voltage and the leakage current are specified for each of the relationships between these circuits.

A solid-state image pickup device 77 (referred to as SID hereinafter) is built at the end of the electroscope 2, and a plurality of drive signals are applied to the SID 77 from an SID driver 79 in a processing unit 78 on the body side of the apparatus. These drive signals are transmitted by, for example, coaxial cables 81, 81. In addition, the signal output from SID 77 is amplified by an amplifier 82, transmitted through a coaxial cable 83, amplified by an amplifier 84 into the sheath 73, and then input in a driver 85 for driving an isolation circuit 89.

Power is supplied to each of the above-described two drivers 79 and 85 from a diagnostic circuit power source 86. The power source 86 also supplies driving power to the SID 77.

The driver 79, which outputs the drive signals to the SID 77, is supplied a timing signal from an SID timing signal generator 88 through an isolation circuit 87.

The output from the driver 85, in which the output signal from the amplifier 84 is input, is also input in a signal processing circuit 91 through the isolation circuit 89, and the image signal processed is output from a signal output terminal 92.

Power is supplied to each of the SID timing signal generator 88 and the signal processing circuit 91 from a secondary circuit power source 93. Power is supplied to the portion of each of the isolation circuits 87, 89 on the side of the secondary circuit 74 and to the portion thereof on the side of the diagnostic circuit 75 from the secondary circuit power source 93 and the diagnostic circuit power source 86, respectively. Commercial alternating current power is supplied to the diagnostic power source 86 and the secondary circuit power source 93 from secondary coils 95a and 95b, respectively, which are isolated from each other by a power transformer 94.

In the electric knife 60, the signal output from an oscillator 97 is supplied to the ablation electrode 64 through an isolating transformer 98. The high-frequency output signal supplied to the ablation electrode 64 is returned to the transformer 98 through a plate 99 which has a large area and is brought into a patient.

Consequently, in this electronic endoscopic apparatus 71, the electrical circuit in the electroscope 2 which is inserted into the body of a patient is isolated (meaning that it is floated on) from the ground (the sheath 73 is equivalent to ground) having the most stable reference potential. The electrical circuit including the GND (ground) thereof has thus a configuration which is greatly affected by the noise of the electric knife 60, etc.

Figure 6:
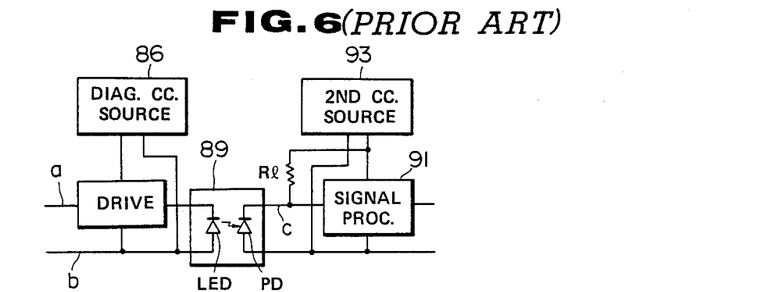
FIG. 6 is a block diagram of an isolation circuit portion which is used in the apparatus shown in FIG. 5.

An example of a configuration of the circumference of the isolation circuit 89 is shown in FIG. 6.

The output from the driver 85 in which a signal a is input is input in an LED which constitutes a photocoupler serving as the isolation circuit 89. The light emission output from the LED is received by a photodiode PD (or a phototransistor) in which the output is converted into an electrical signal. The cathode of the photodiode PD is connected to the secondary circuit power source 93 through a load resistance R1.

Figure 7A:
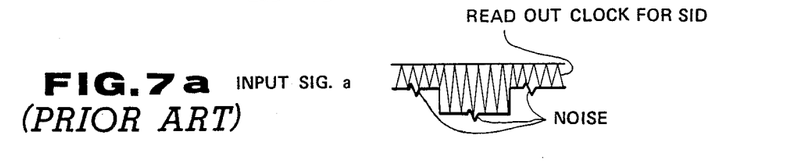
FIGS. 7a–7c are drawings of waveforms used for explaining the action of FIG. 6.
Figure 7B:
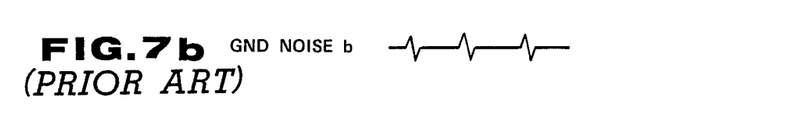
Figure 7C:
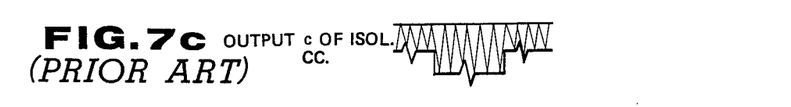

In this case, for example, if the input signal a shown in FIG. 7(a) is mixed with the noise b of the diagnostic circuit GND shown in FIG. 7(b), a signal c at an output terminal of the isolation circuit 89 is an output signal containing the noise, as shown in FIG. 7(c).

In addition, it is generally necessary to supply as drive signals to the SID 77, which is contained in the scope 2 at the end thereof, a plurality of high-frequency pulses such as horizontal and vertical drive signals. In the transmission of such signals, the coaxial cables 81 described above or the shielding cables are generally used as measures against the effect of noise, cross talk and unnecessary radiation.

Such signals also constitute the diagnostic circuit 75, and it is apparent from FIG. 5 that the diagnostic circuit 75 has a configuration easily affected by the noise due to a loop formed for external noise in the shield portions of the coaxial cables 81 and the above-described floating configuration.

On the other hand, U.S. Pat. No. 4,607,621 proposed an apparatus characterized in that a signal cable in a scope is received in a conductive shield which is electrically connected to a chassis of a signal processing apparatus, and the chassis is connected to a high-frequency ground point of a high-frequency power unit (electric knife body).

However, the above-described U.S. Pat. in practice cannot easily satisfy the resisting voltage of the safety standard defined by IEC between the circuit in the scope and the chassis.

There is consequently the possibility that a problem with respect to guarantee for the safety of a patient still remains.

OBJECT AND SUMMARY OF THE INVENTION

It is an object of the present invention to provide an electronic endoscopic apparatus which can sufficiently guarantee the safety of a patient.

It is another object of the present invention to provide an electronic endoscopic apparatus which can prevent any influence of the noise caused by an electric knife, etc.

In an electronic endoscopic apparatus of the present invention which is provided with an isolation circuit and a drive circuit for the isolation circuit, the drive circuit has a differential type configuration relative to the ground (of a diagnostic circuit) on the input side of the isolation circuit so that, even if noise is superposed on the ground, a signal is transmitted while the noise is suppressed during transmission by the isolation circuit, whereby sufficient isolation and signal transmission with a high S/N ratio can be performed.

BRIEF DESCRIPTION OF DRAWINGS

FIGS. 8 to 10 concern a first embodiment of the present invention in which

DETAILED DESCRIPTION OF PREFERRED EMBODIMENTS

The external shape of an electronic endoscopic apparatus 101 of a first embodiment is the same as that shown in FIG. 1 which is thus used again for explaining the first embodiment.

Figure 10:
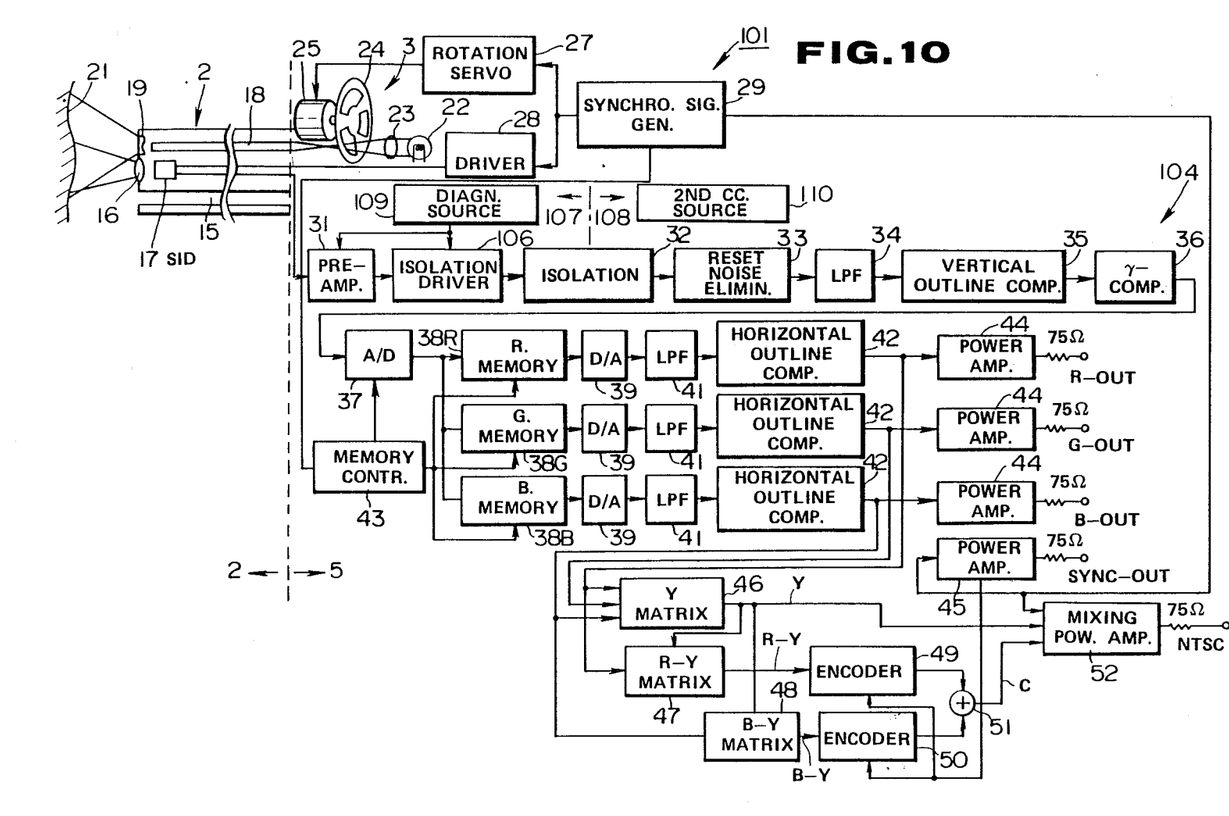
FIG. 10 is a block diagram of the configuration of an electronic endoscopic apparatus of the first embodiment.

The signal processing apparatus 5 in this embodiment shown in FIG. 10 is the same as the signal processing apparatus 5 shown in FIG. 2 except that an isolation drive circuit 106 is interposed between the preamplifier 31 and the isolation circuit 32. The isolation circuit 32 causes a diagnostic circuit 107 on the front side (input side) of the isolation circuit 32 in which a signal is input to connect to a secondary circuit 108 on the rear side (output side) thereof from which a signal is output in a state similar to electrically isolated separation. Power is supplied to the preamplifier 31 and the (isolation) drive circuit 106 in the front stage of the isolation circuit 32 from a diagnostic circuit power source 109.

In addition, power is supplied to the secondary circuit 108 which forms a signal processing unit 104 behind a reset noise eliminating circuit 33 from a secondary circuit power source 110. These two power sources 109 and 110 are isolated from each other, and commercial electrical power is supplied thereto (for example, alternating current power is supplied to each of the power sources from secondary windings of a power transformer which are isolated from each other).

The other elements are the same as those shown in FIG. 2 and are thus denoted by the same reference numerals and are not described here.

Figure 8:
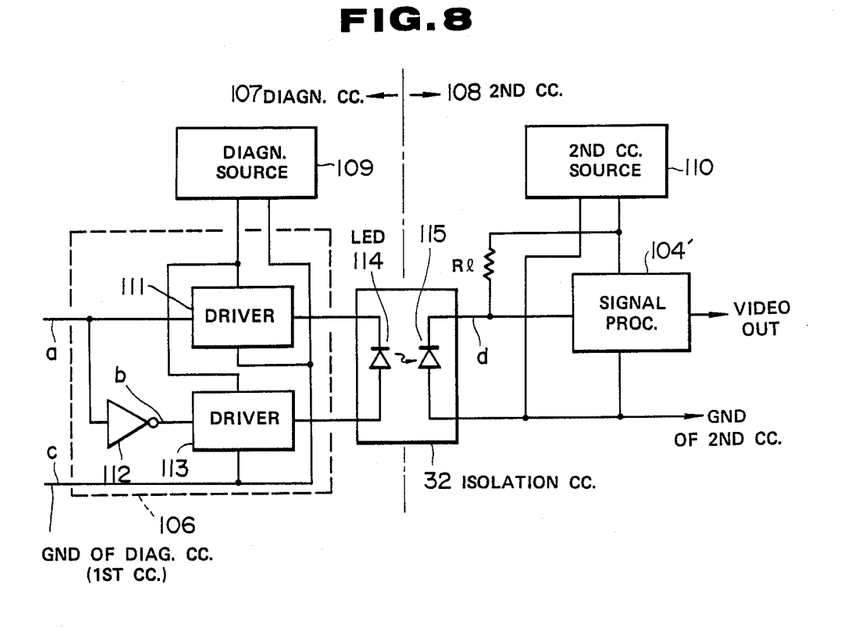
FIG. 8 is a block diagram of the peripheral portion of an isolation circuit in the first embodiment.

The peripheral portion of the drive circuit 106 has the configuration shown in FIG. 8.

An input signal a passed through the preamplifier 31 is input in a first driver 111, as well as being passed through an inverter 112 (inversion circuit) to form an inverted signal b which is then input in a second driver 113 having the characteristics equivalent to those of the first driver 111. Therefore, the output signals passed through the first and second drivers 111 and 113 are input in LED 114 which forms the isolation circuit 32. In LED 114, light is emitted by the differential output of the two drivers 111 and 113 which have a differential type configuration comprising the first driver 111 and the second driver 113 with the inverter 112 therebetween. The emission output from the LED 114 is received by a photodiode 115 and the output signal d subjected to photoelectric conversion is input in a signal processing circuit 104' on the side of the secondary circuit 108 (except for the secondary circuit power source 110 in the secondary circuit 108). The cathode of the photodiode 115 is connected to the secondary circuit power source 110 through a load resistance Rl.

In the first embodiment configured as described above, the side of the diagnostic circuit 107 and the side of the secondary circuit 108 are dielectrically separated from each other by the isolation circuit 32 so that a signal is transmitted by optical coupling of a differential type of signal output using the differential type drive circuit 106 (the GND line is not directly connected to the primary side of the isolation circuit 32) during transmission of a signal.

Figure 9A:
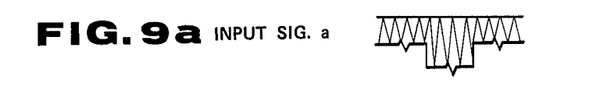
FIGS. 9a–9d are drawings of waveforms used for explaining the action of FIG. 8
Figure 9B:
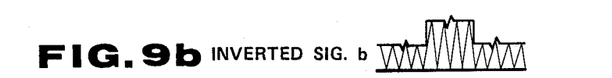
Figure 9C:
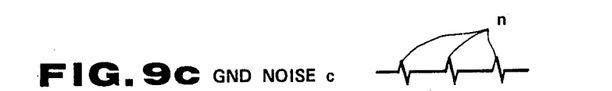

Therefore, in the case of the input signal a shown in FIG. 9a, the inverted signal b passed through the inverter 112 is the signal shown in FIG. 9b. Although the noise in the above-described two signals a, b can be sufficiently suppressed to a low level due to signal transmission using an internal conductor because the coaxial cables are used in signal transmission from SID, larger noise n, as shown in FIG. 9c, than that produced in the internal conductor, is easily mixed in the GND of the diagnostic circuit 107 to which the external conductors of the coaxial cables are connected, for example, during use of the electric knife.

Figure 9D:
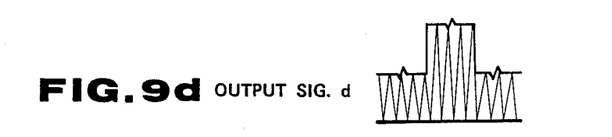

Even if the above-described noise n is mixed in, since this GND is not directly connected to LED 114 of the isolation circuit 32, the noise n mixed in the GND has substantially no effect on the emission output because the emission of GND is performed by the differential output between the differential type drivers 111, 113. Therefore, the output signal d from the photodiode 115 which is subjected to photoelectric conversion is a signal containing substantially no noise, as shown in FIG. 9d.

The actions of the elements shown in FIG. 8, except for the isolation circuit 32 and the drive circuit 106, are the same as those described in FIG. 2 and thus are not described here.

In accordance with the first embodiment configured as described above, the power source lines on the diagnostic circuit side and the secondary circuit side can be electrically isolated by a simple configuration, signal transmission with sufficient safety and a high S/N ratio can be performed because the differential type drive circuit 106 prevents any noise components from being transmitted by the isolation circuit 32. In particular, an image of high quality can be obtained when the electric knife is used. It is apparent that a phototransistor can be used in place of the photodiode 115. Other optical devices can also be used.

Figure 11:
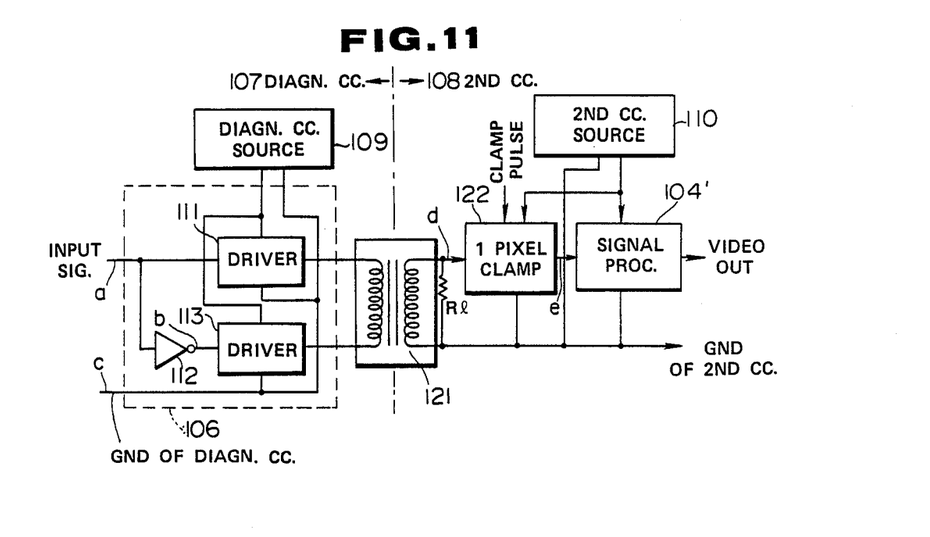
FIG. 11 is a block diagram of the peripheral portion of an isolation circuit in a second embodiment of the present invention.

FIG. 11 shows a principal portion of a second embodiment of the present invention.

In this second embodiment, a wide-band pulse transformer 121 is used as an isolation circuit.

The same drive circuit 106 as that in the first embodiment is connected to the primary side of this wide-band pulse transformer 121, and a load resistance Rl is connected to the secondary side thereof. The output signal d induced on the secondary side is input in a 1-picture element clamp circuit 122, and the signal e clamped by a clamp pulse is input in a signal processing circuit 104'.

In this second embodiment, since the wide-band pulse transformer 121 used as the isolation means in the first embodiment cannot transmit any direct current component (DC component) due to the characteristics thereof, and alternating current (AC) coupling thus takes place in the pulse transformer 121, the output from the transformer 121 is subjected to DC regeneration in the 1-picture element clamp circuit 122 which can be composed of a direct current regeneration circuit. The other elements are the same as those in the first embodiment.

Figure 12A:
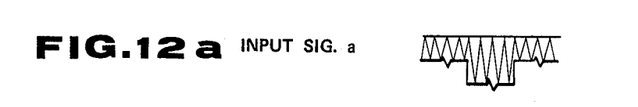
FIGS. 12a–12e are drawings of waveforms used for explaining the action of the second embodiment.
Figure 12B:
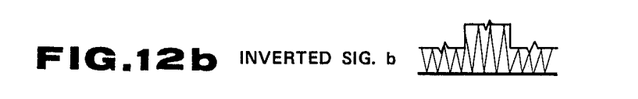
Figure 12C:
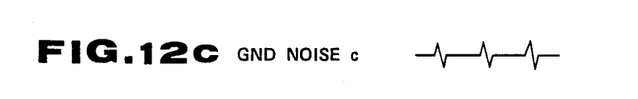
Figure 12D:
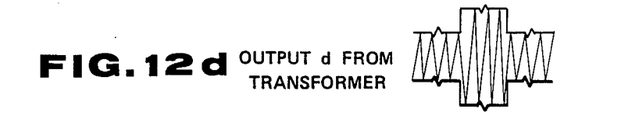
Figure 12E:
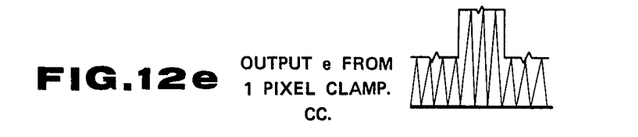

In this second embodiment, when an input signal a, an inverted signal b and GND noise c are respectively the signals shown in FIGS. 12a, 12b and 12c in the same way as in the first embodiment, the output from the transformer 121 is that shown in FIG. 12d, and the output from the 1-picture element clamp circuit 122 is that shown in FIG. 12e. The diagnostic circuit 107 and the secondary circuit 108 are electrically isolated by the transformer 121, and a signal can be output while is suppressed. In addition, a signal with the DC level regenerated can be obtained by the 1-picture element clamp circuit 122.

The functional effect of the second embodiment is substantially the same as that of the first embodiment.

Figure 13:
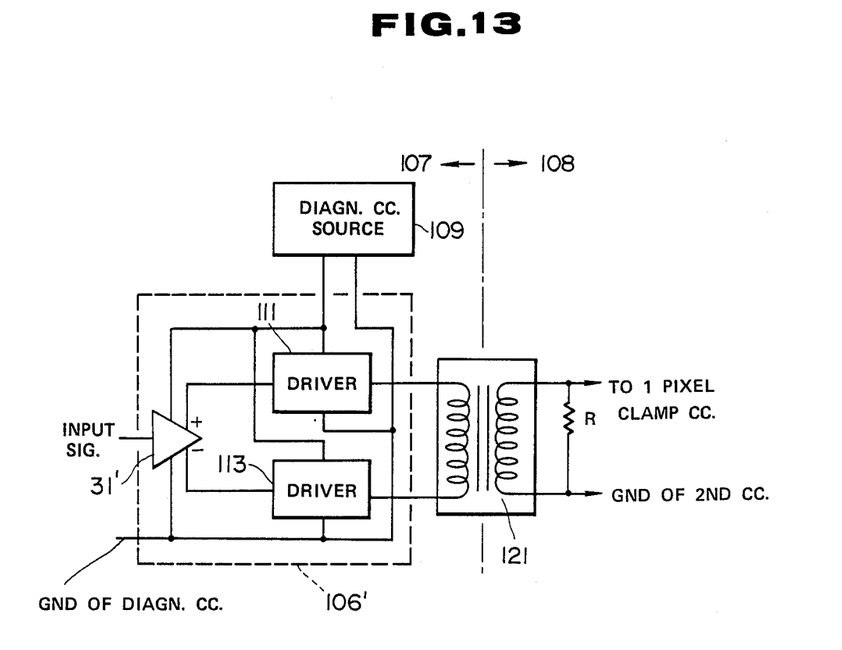
FIG. 13 is a block diagram of a principal portion of a modified example of the second embodiment.

FIG. 13 shows a modified example of the second embodiment.

In this modified example, the preamplifier 31 in the front stage of the drive circuit 106 in the second embodiment is replaced by a differential amplifier 31' so that the uninverted output from the differential amplifier 31' is input in the first driver 111 and the inverted output is input in the second driver 113 to form a drive circuit 106' which requires no inverter 112.

It is apparent that the modified example can be applied to the first embodiment.

Figure 14:
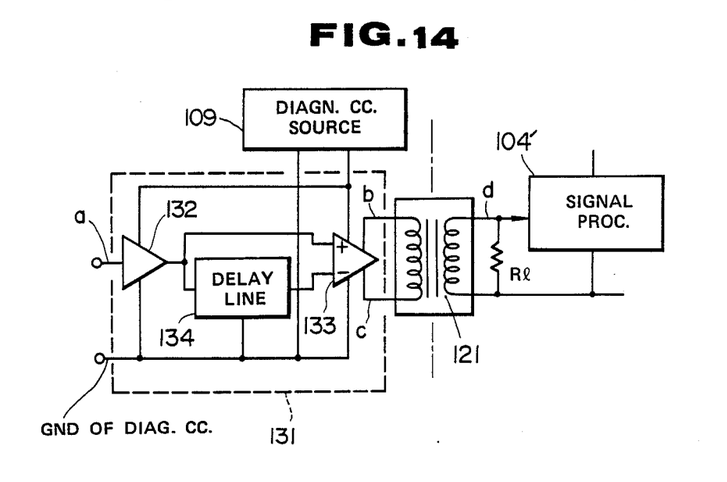
FIG. 14 is a block diagram of the peripheral portion of an isolation circuit in a third embodiment of the present invention.

FIG. 14 shows a principal portion of a third embodiment of the present invention.

Figure 15A:
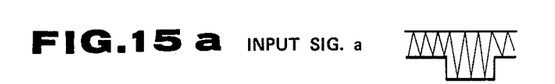
FIGS. 15a–15d are drawings of waveforms used for explaining the action of the third embodiment.
Figure 15B:
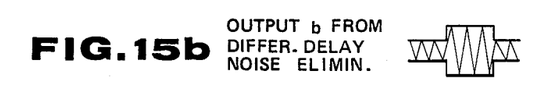
Figure 15C:
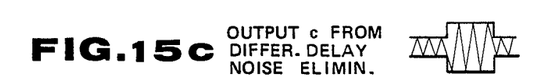
Figure 15D:
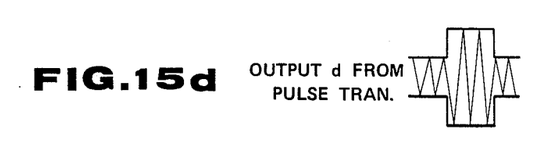

In this third embodiment, a differential delay noise eliminating circuit 131 is provided in, for example, the front stage of the isolation circuit formed by the wideband pulse transformer 121 to form an (isolation) drive circuit. The input signal a passed through the preamplifier 31 shown in FIG. 10 is input in a buffer amplifier 132 the output from which is applied to a non-inversion input terminal of a differential amplifier 133, as well as being applied to an inversion input terminal of the differential amplifier 133 through a delay line 134. Thus, the uninverted output b and the inverted output c from the differential amplifier 133 are the signals shown in FIGS. 15b and 15c, respectively, relative to the input signal a shown in FIG. 15a. The output signal d passed through the pulse transformer 121 is the signal shown in FIG. 15d and is input in the signal processing circuit 104'.

The delay line 134 is so set that the delay amount corresponds to half of a picture element.

The differential delay noise eliminating circuit 131 is used as an eliminating circuit for eliminating reset noise in an output signal in, for example, the reset noise eliminating circuit 33 when SID is used. When this differential delay noise eliminating circuit 131 is provided in the front stage of the isolation circuit, the baseband component need not be transmitted (when it is provided in the rear stage of the isolation circuit, only a low-level component is extracted by a low-pass filter), the circuit 131 is optimum for the isolation circuit formed by the pulse transformer 121 which cannot transmit the low-level component.

A clipping circuit may be provided in the rear stage of the differential amplifier 133 so as to eliminate rest noise. A pre-clipping circuit may also be provided in the front stage of the buffer amplifier 132 so as to decrease the reset pulse in a signal.

Figure 16:
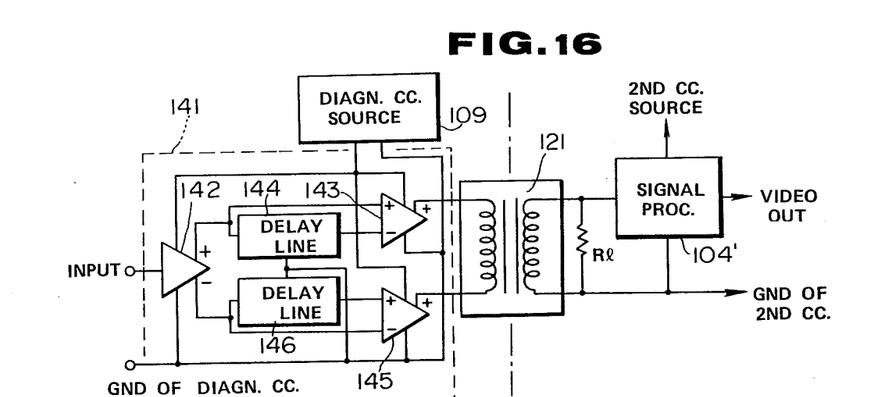
FIG. 16 is a block diagram of the peripheral portion of an isolation circuit in a fourth embodiment of the present invention.

FIG. 16 shows a principal portion of a fourth embodiment of the present invention.

This fourth embodiment is developed from the aforementioned third embodiment, in which the above-described differential delay noise eliminating circuit 131 is replaced by a drive circuit 141 which has a symmetrical configuration with respect to the primary side of the isolation transformer 121.

An input signal is input in a differential output buffer amplifier 142 the uninverted output from which is directly input in a first differential amplifier 143, as well as being input in the differential amplifier 143 through a delay line 144.

Similarly, the inverted output from the buffer amplifier 142 is directly input in a differential amplifier 145, as well as being input in the differential amplifier 145 through a delay line 146.

For example, the uninverted output signals from the two differential amplifiers 143, 145 are input in the transformer 121 which forms an isolation circuit.

The other elements are the same as those in the third embodiment.

In this fourth embodiment, since the drive circuits 131 in the third embodiment are symmetrically disposed, the effects of connection between the delay lines 144, 146 and GND are removed by the differential output. Therefore, if noise is mixed in GND, it is possible to sufficiently suppress the noise from being transmitted through the isolation circuit and thus to transmit a signal with a high S/N ratio.

In each of the above-described third and fourth embodiments, although the isolation circuit is formed by the pulse transformer 121, the isolation circuit is not limited to this and may be formed by the optical isolation means used in the first embodiment.

Figure 17:
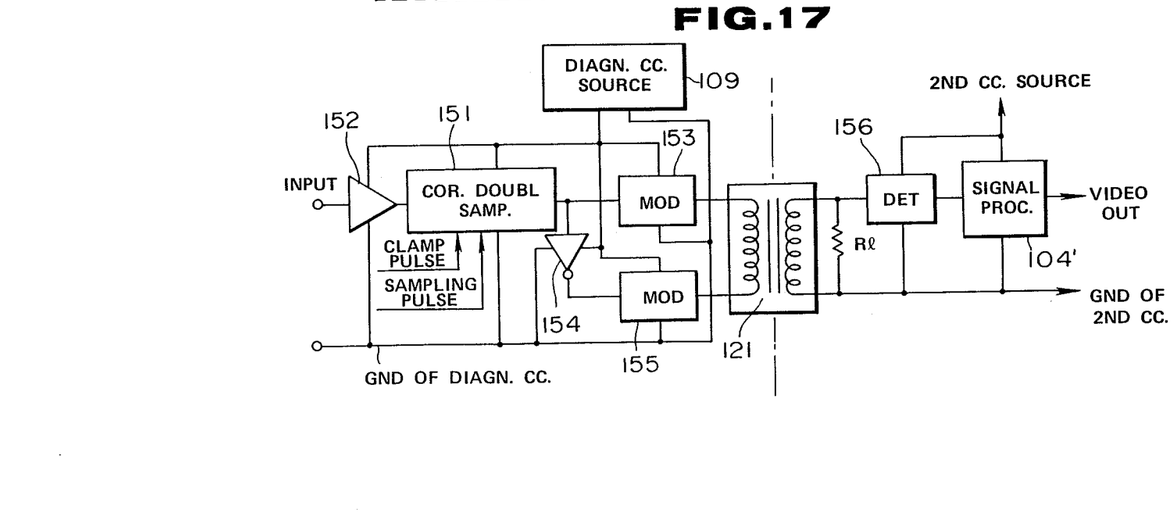
FIG. 17 is a block diagram of the peripheral portion of an isolation circuit in a fifth embodiment of the present invention.

FIG. 17 shows a principal portion of a fifth embodiment of the present invention.

This fifth embodiment is formed by using a correlation double sampling circuit 151 (CSD). The output from a buffer amplifier 152 is input in the synchronous double sample circuit 151 in which a clamp pulse and a sampling pulse are input and from which a signal without having any reset noise is output.

Since the output from the correlation double sampling circuit 151 becomes a video signal of the baseband, the pulse transformer 121 which cannot transmit a low-level component due to its characteristics requires some means. In the fifth embodiment, DC and low-level components are modulated to carrier signals by using a modulator 153 and applied to the transformer 121. During this, the output a from the correlation double sampling circuit is directly input in the modulator 153, as well as being input in another modulator 155 through an inverter 154, and the output from the modulators 153, 155 which have a differential configuration is input in the primary side of the transformer 121.

Therefore, the secondary output from the transformer 121 is input in a demodulator 156 and then input in the signal processing circuit 104'.

Each of the above-described modulators 153, 155 can employ AM, PM, FM or PWM.

For example, the circuit described in M. H. White et al., IEEE J. of Solid-State Circuits, SC-9, 1, 1–13 (1974) can be used as the correlation double sampling circuit 151.

In the aforementioned fifth embodiment, the correlation double sampling circuit 151 can be made positively and negatively symmetrical with respect to GND of the diagnostic circuit so that the effect of the noise of this circuit 151 superposed on GND can be reduced (suppressed).

The fifth embodiment may use the optical isolation means in place of the pulse transformer 121.

In each of the above-mentioned embodiments, the electroscopic side may be so configured that an impedance circuit or element which is equivalent to the output impedance of SID 17 is connected to the side of non-inversion input of the differential amplifier 66 shown in FIG. 4.

The present invention can also be applied to the case in which a video camera containing SID is mounted on the ocular portion of a fiberscope.

As described above, since the present invention has the isolation means between the diagnostic circuit and the rear stage side thereof has a differential configuration which exhibits significant suppression of noise on the ground of the diagnostic circuit, the invention has the advantages that safety is secured, external noise can be reduced, and an S/N ratio can be increased.

What is claimed is:

1. An electronic endoscope apparatus comprising:
    an electronic endoscope provided with a long thin insertion portion, an illuminating optical system which projects illuminating light from the end thereof, an objective optical system which is provided at the end of said invertion portion, and a solid-state image pickup device in which an optical image based on said objective optical system is subjected to photoelectrical conversion;

a drive circuit outputting a drive signal for reading a signal to said solid-state image pickup device;

a signal processing circuit for processing the signal output from said solid-state image pickup device by application of said drive signal thereto to form a given image signal;

an isolation means provided in said signal processing circuit for electrically isolating the input signal side from the output signal side;

a differential isolation drive means for outputting a differential drive signal which is isolated from ground and for driving said isolation means using said differential drive signal; and a monitor means for displaying said given image signal.

2. An apparatus according to claim 1, wherein said isolation means comprises an emission element and a light receiving element which receives the light emitted from said emission element and performs photoelectric conversion.

3. An apparatus according to claim 1, wherein said isolation means comprises a pulse transformer having a wide-band transmission characteristic in that the primary side and the secondary side are separated from each other.

4. An apparatus according to claim 3, wherein said differential isolation drive means comprises a first amplifier circuit which amplifies a signal for driving said isolation means and a second amplifier circuit having the same characteristics as those of said first amplifier circuit, with a inversion circuit therebetween.

5. An apparatus according to claim 3, wherein said pulse transformer has a direct current regeneration circuit for regenerating a direct current level on the secondary side thereof.

6. An apparatus according to any one o claims 1, 2 or 3, wherein said differential isolation drive means comprises a buffer amplifier for amplifying an input signal, a delay element for providing the output from said buffer amplifier with a delay amount corresponding to half of a picture element and a differential delay noise eliminating circuit in which the output from said buffer amplifier and the output from said delay element are input and which is provided with a differential input and output terminals.

7. An apparatus according to any one of claims 1, 2 or 3, wherein said differential isolation drive means comprises a differential output type of buffer amplifier which amplifies an input signal, a differential amplifier in which the signal passed through a delay element for providing the uninverted output from said buffer amplifier with the delay corresponding to half of a picture element and the delayed signal are input, and a differential amplifier in which the signal passed through said delay element for providing the inverted output from said buffer amplifier with the delay corresponding to half of a picture element and the delayed signal are input.

8. An apparatus according to claim 1, wherein said differential isolation drive means has a correlation double sampling circuit.

9. An apparatus according to claim 1, wherein said differential isolation drive means has two modulators so that said isolation means is driven by the output signals from said two modulators, as well as having a demodulator for demodulating the signals modulated in said two modulators on the output side of said isolation means.

10. A signal processing apparatus for an electronic endoscopic comprising:

a signal processing circuit for said electronic endoscope in which a solid-state image pickup device is disposed on the end of a long thin insertion portion which can be inserted into a body cavity so that signal processing is performed for said electronic endoscope to produce a given image signal;

an isolation means provided in said signal processing circuit for said electronic endoscope for electrically isolating the grounds of the input side and the output side from each other; and a differential drive means for outputting a differential drive signal isolated from ground and for generating an input signal for said isolation means using said differential drive signal.

11. An apparatus according to claim 10, wherein said isolation means comprises an emission element and a light receiving element which receives the light emitted from said the emission element and performs photoelectric conversion.

12. An apparatus according to claim 10, wherein said isolation means comprises a pulse transformer having a wide-band transmission characteristic in that the primary side and the secondary side are separated from each other.

13. An apparatus according to claim 10, wherein said differential drive means comprises a first amplifier circuit which amplifies a signal for driving said isolation means and a second amplifier circuit having the same characteristics as those of said first amplifier circuit, with an inversion circuit therebetween.

14. An apparatus according to claim 12, wherein said pulse transformer has a direct current regeneration circuit for regenerating a direct current level on its secondary side.

15. An apparatus according to any one of claims 10, 11 or 12, wherein said differential drive means comprises a buffer amplifier for amplifying an input signal, a delay element for providing the output from said buffer amplifier with a delay amount corresponding to half of a picture element and a differential delay noise eliminating circuit in which the output from said buffer amplifier and the output from said delay element are input and which is provided with a differential input and output terminals.

16. An apparatus according to any one of claims 10, 11 or 12, wherein said differential drive means comprises a differential output type of buffer amplifier which amplifies an input signal, a differential amplifier in which the signal passed through a delay element for providing the uninverted output from said buffer amplifier with the delay corresponding to half of a picture element and the delayed signal are input, and a differential amplifier in which the signal passed through said delay element for providing the inverted output from said buffer amplifier with the delay corresponding to half of a picture element and the delayed element are input.

17. An apparatus according to claim 10, wherein said differential drive means has a correlation double sampling circuit.

18. An apparatus according to claim 10, wherein said differential drive means has two modulators so that said isolation means is driven by the output signals from said two modulators, as well as having a demodulator for demodulating the signals modulated in said two modulators on the output side of said isolation means.

* * * * *

UNITED STATES PATENT AND TRADEMARK OFFICE
CERTIFICATE OF CORRECTION

PATENT NO. : 4,868,647
DATED : September 19, 1989
INVENTOR(S) : UEHARA et al

It is certified that error appears in the above-identified patent and that said Letters Patent is hereby corrected as shown below:

On the cover page, Item [30], "52-230664" should read

--62-230664--.

Signed and Sealed this

Twenty-sixth Day of March, 1991

Attest:

HARRY F. MANBECK, JR.

Attesting Officer

Commissioner of Patents and Trademarks